United States Patent
Al-Mohsen et al.

(10) Patent No.: US 11,988,085 B2
(45) Date of Patent: May 21, 2024

(54) METHOD AND SYSTEM FOR DETERMINING VIRTUAL FLOW SENSING MEASUREMENTS

(71) Applicant: SAUDI ARABIAN OIL COMPANY, Dhahran (SA)

(72) Inventors: Abduljabbar S. Al-Mohsen, Abqaiq (SA); Freddy G. Rubiano Morales, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 413 days.

(21) Appl. No.: 17/334,210

(22) Filed: May 28, 2021

(65) Prior Publication Data

US 2022/0389809 A1 Dec. 8, 2022

(51) Int. Cl.
*E21B 47/07* (2012.01)
*E21B 41/00* (2006.01)
(Continued)

(52) U.S. Cl.
CPC .......... *E21B 47/07* (2020.05); *E21B 41/0071* (2013.01); *E21B 47/09* (2013.01); *G01F 1/34* (2013.01); *G05D 7/00* (2013.01); *E21B 2200/20* (2020.05); *F17C 2250/00* (2013.01); *F17C 2250/03* (2013.01); *F17C 2265/031* (2013.01)

(58) Field of Classification Search
CPC .......... E21B 34/02; E21B 34/06; E21B 43/12; E21B 2200/20; E21B 41/0071; E21B 47/06; E21B 21/08
See application file for complete search history.

(56) References Cited

U.S. PATENT DOCUMENTS 4,562,744 A 1/1986 Hall et al.
6,830,061 B2 12/2004 Adams et al.
(Continued)

FOREIGN PATENT DOCUMENTS

EP 3 472 573 A1 4/2019
WO 2010042223 A1 4/2010

OTHER PUBLICATIONS

Sbarbaro, Daniel et al., "Chapter 4: Soft Sensing", Advanced Control and Supervision of Mineral Processing Plants, United States, Springer Publishing, 2010, pp. 143-209 (67 pages).
(Continued)

*Primary Examiner* — Zakiya W Bates
(74) *Attorney, Agent, or Firm* — Osha Bergman Watanabe & Burton LLP

(57) ABSTRACT

A method may include obtaining first pressure data regarding a first pressure sensor upstream from a restricted orifice and second pressure data regarding a second pressure sensor downstream from the restricted orifice. The method may further include obtaining temperature data regarding a temperature sensor coupled to the restricted orifice. The method may further include obtaining various gas parameters regarding a predetermined gas flowing through the restricted orifice and various orifice parameters regarding the restricted orifice. The method may further include determining a first gas flow rate of the predetermined gas based on a gas flow model, the first pressure data, the second pressure data, the temperature data, the gas parameters, and the orifice parameters.

20 Claims, 5 Drawing Sheets

(51) Int. Cl.
 *E21B 47/09* (2012.01)
 *G01F 1/34* (2006.01)
 *G05D 7/00* (2006.01)

(56) References Cited

U.S. PATENT DOCUMENTS

| | | |
|---|---|---|
| 6,990,414 B2 | 1/2006 | Belke et al. |
| 7,258,024 B2 | 8/2007 | Dimarco et al. |
| 9,388,686 B2 | 7/2016 | Konopczynski et al. |
| 10,000,704 B2 | 6/2018 | Young et al. |
| 10,788,407 B2 | 9/2020 | Nazari et al. |
| 10,850,314 B2 | 12/2020 | Chambers |
| 2008/0011821 A1 | 1/2008 | Ellender et al. |
| 2008/0300802 A1 | 12/2008 | Akhani et al. |
| 2010/0152900 A1 | 6/2010 | Gurciullo et al. |
| 2011/0132592 A1 | 6/2011 | Apple et al. |
| 2017/0138154 A1* | 5/2017 | Burdick ............ F16K 31/046 |
| 2017/0275981 A1 | 9/2017 | Coudroy et al. |
| 2018/0004234 A1 | 1/2018 | Dursun et al. |
| 2019/0368916 A1 | 12/2019 | Al-Abdulwahed |
| 2020/0133251 A1 | 4/2020 | Rossi |
| 2020/0182036 A1 | 6/2020 | Rangarajan et al. |

OTHER PUBLICATIONS

Frames Separation Technologies, "Produced Water Treatment", Product Leaflet, 2019, pp. 1-8 (8 pages).

AFG Combustion, "Knock Out Drums", available at <https://airoilflaregas.com/pdf/KnockOutDrums.pdf>, published 2021, last accessed May 27, 2021 (1 page).

International Search Report and Written Opinion of the International Searching Authority issued in corresponding International (PCT) Application No. PCT/US2022/031377, dated Sep. 21, 2022.

\* cited by examiner

METHOD AND SYSTEM FOR DETERMINING VIRTUAL FLOW SENSING MEASUREMENTS

BACKGROUND

Various wells may produce a gas-liquid mixture that passes through one or more separators to remove gas and water from crude oil. For example, a gas plant may separate the natural gas materials at this stage for transportation accordingly. However, in some situations, the piping infrastructure is not currently in place for transporting natural gas. Thus, the excess gas may be flared off using a flare stack. Where the piping infrastructure does exist, gas may be flared for safety reasons, maintenance, or due to gas production being above the demand for natural.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a system that includes a flare device and a pipeline that includes a restricted orifice and is coupled to the flare device. The pipeline transmits a predetermined gas to the flare device. The system further includes a first pressure sensor coupled to the pipeline and disposed upstream from the restricted orifice, and a second pressure sensor coupled to the pipeline and disposed downstream from the restricted orifice. The system further includes a control system coupled to the first pressure sensor and the second pressure sensor. The control system determines a gas flow rate of the predetermined gas using a gas flow model, pressure data from the first pressure sensor and the second pressure sensor, a size of the restricted orifice, and at least one gas parameter regarding the predetermined gas.

In general, in one aspect, embodiments relate to a method that includes obtaining, by a control system, first pressure data regarding a first pressure sensor upstream from a restricted orifice and second pressure data regarding a second pressure sensor downstream from the restricted orifice. The method further includes obtaining, by the control system, temperature data regarding a temperature sensor coupled to the restricted orifice. The method further includes obtaining, by the control system, various gas parameters regarding a predetermined gas flowing through the restricted orifice and various orifice parameters regarding the restricted orifice. The method further includes determining, by the control system, a first gas flow rate of the predetermined gas based on a gas flow model, the first pressure data, the second pressure data, the temperature data, the gas parameters, and the orifice parameters.

In general, in one aspect, embodiments relate to a system that includes a pipeline that includes a restricted orifice and coupled to a gas inlet and a gas outlet. The pipeline is configured to transmit a predetermined gas from the gas inlet to the gas outlet. The system further includes a first pressure sensor coupled to the pipeline and disposed upstream from the restricted orifice. The system further includes a second pressure sensor coupled to the pipeline and disposed downstream from the restricted orifice. The system further includes a computer device coupled to the first pressure sensor and the second pressure sensor. The system further includes the computer device determines a first gas flow rate of the predetermined gas using a gas flow model, pressure data from the first pressure sensor and the second pressure sensor, a size of the restricted orifice, and a gas parameter regarding the predetermined gas.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for determining a gas flow rate using virtual flow sensing. Rather than use a purely hardware flowmeter to determine gas flow rates, soft measurement logic may be used to analyze a particular gas flow. In some embodiments, for example, a virtual flow measurement system determines a gas flow rate within process piping from existing instruments (e.g., pressure transmitters, restricted orifices, and control systems that are used for other plant purposes) and a gas flow model for a specific gas passing through the restricted orifice. In particular, a control system (such as a distributed control system (DCS)) may implement this virtual flow sensing in some embodiments. The control system may obtain upstream pressure data and downstream pressure data for a particular restricted orifice, and then determine a gas flow rate based on gas parameters and orifice parameters associated with the gas flow model.

Furthermore, virtual flow sensing may be used in place of cumbersome physical flow measurement devices. By using available information available from other measurements and process parameters, some embodiments may eliminate a need to install a hardware flowmeter to measure a particular gas flow rate. For example, hardware flowmeters may include differential pressure sensors and corresponding orifice plates that may be approximated in virtual flow sensing using existing instruments. Thus, virtual flow sensing may avoid piping modifications to a gas plant as well as shutting down the facility, which can result in lost plant production.

Figure 1:
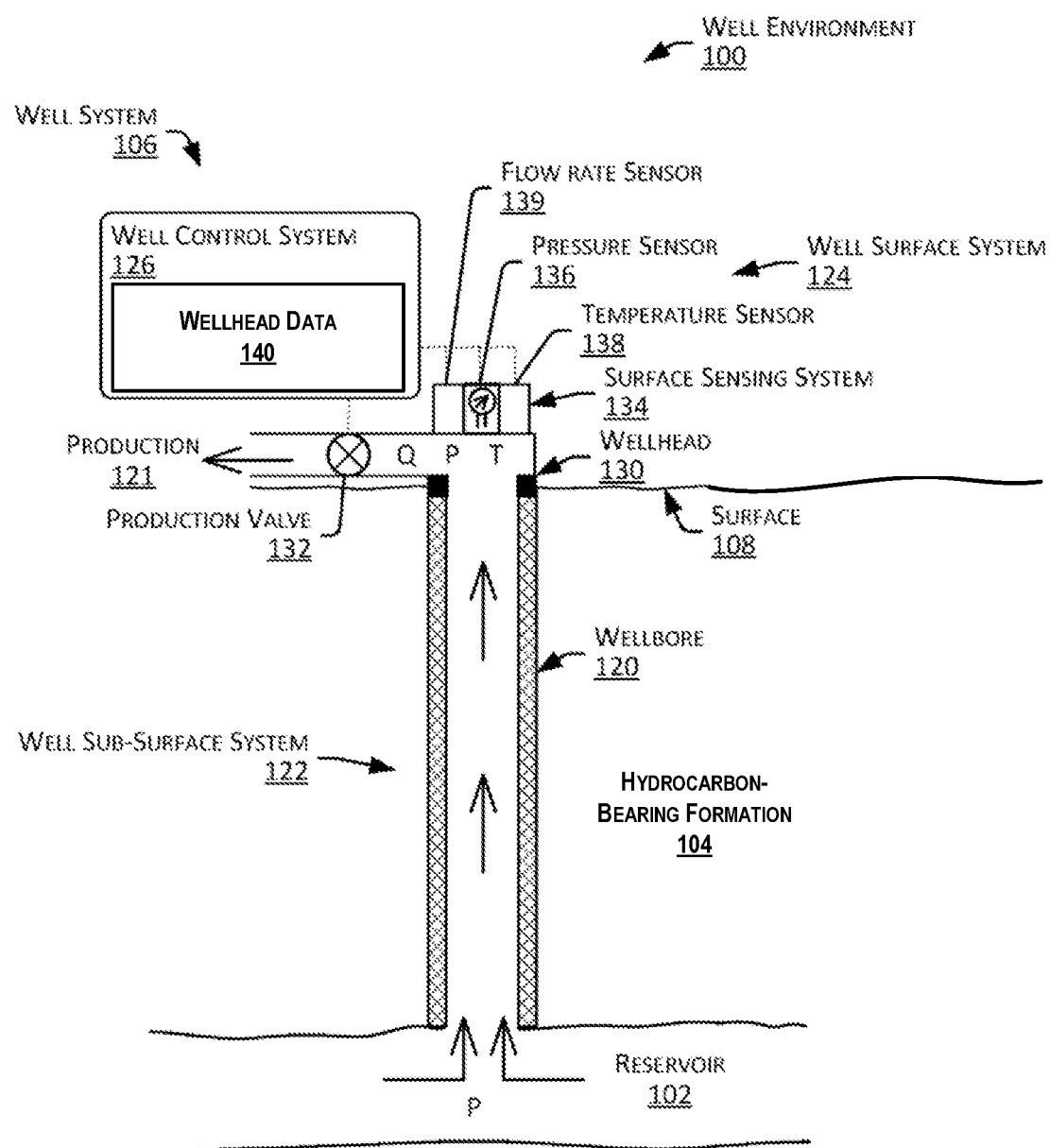
FIGS. 1, 2, and 3 show systems in accordance with one or more embodiments.

Turning to FIG. 1, FIG. 1 shows a schematic diagram in accordance with one or more embodiments. As shown in FIG. 1, FIG. 1 illustrates a well environment (100) that includes a hydrocarbon reservoir ("reservoir") (102) located in a subsurface hydrocarbon-bearing formation (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, and resistivity. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system (126). The control system (126) may control various operations of the well system (106), such as well production operations, well completion operations, well maintenance operations, and reservoir monitoring, assessment and development operations. In some embodiments, the control system (126) includes a computer system that is the same as or similar to that of computer system (502) described below in FIG. 5 and the accompanying description.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records wellhead data (140) for the well system (106). The wellhead data (140) may include, for example, a record of measurements of wellhead pressure (P) (e.g., including flowing wellhead pressure (FWHP)), wellhead temperature (T) (e.g., including flowing wellhead temperature), wellhead production rate (Q) over some or all of the life of the well (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well (106) to assess a relatively current state of the well system (106), and make real-time decisions regarding development of the well system (106) and the reservoir (102), such as on-demand adjustments in regulation of production flow from the well.

With respect to water cut data, the well system (106) may include one or more water cut sensors. For example, a water cut sensor may be hardware and/or software with functionality for determining the water content in oil, also referred to as "water cut." Measurements from a water cut sensor may be referred to as water cut data and may describe the ratio of water produced from the wellbore (120) compared to the total volume of liquids produced from the wellbore (120). Water cut sensors may implement various water cut measuring techniques, such as those based on capacitance measurements, Coriolis effect, infrared (IR) spectroscopy, gamma ray spectroscopy, and microwave technology. Water cut data may be obtained during production operations to determine various fluid rates found in production from the well system (106). This water cut data may be used to determine water-to-gas information regarding the wellhead (130).

In some embodiments, a water-to-gas ratio (WGR) is determined using a multiphase flow meter. For example, a multiphase flow meter may use magnetic resonance information to determine the number of hydrogen atoms in a particular fluid flow. Since oil, gas and water all contain hydrogen atoms, a multiphase flow may be measured using magnetic resonance. In particular, a fluid may be magnetized and subsequently excited by radio frequency pulses. The hydrogen atoms may respond to the pulses and emit echoes that are subsequently recorded and analyzed by the multiphase flow meter.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (134). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (151) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (151) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" (T). In some embodiments, the surface sensing system (134) includes a flow rate sensor (139) operable to sense the flow rate of production (151) flowing through the well surface system (124), after it exits the wellbore (120). The flow rate sensor (139) may include hardware that senses a flow rate of production (121) (Q) passing through the wellhead (130).

Figure 2:
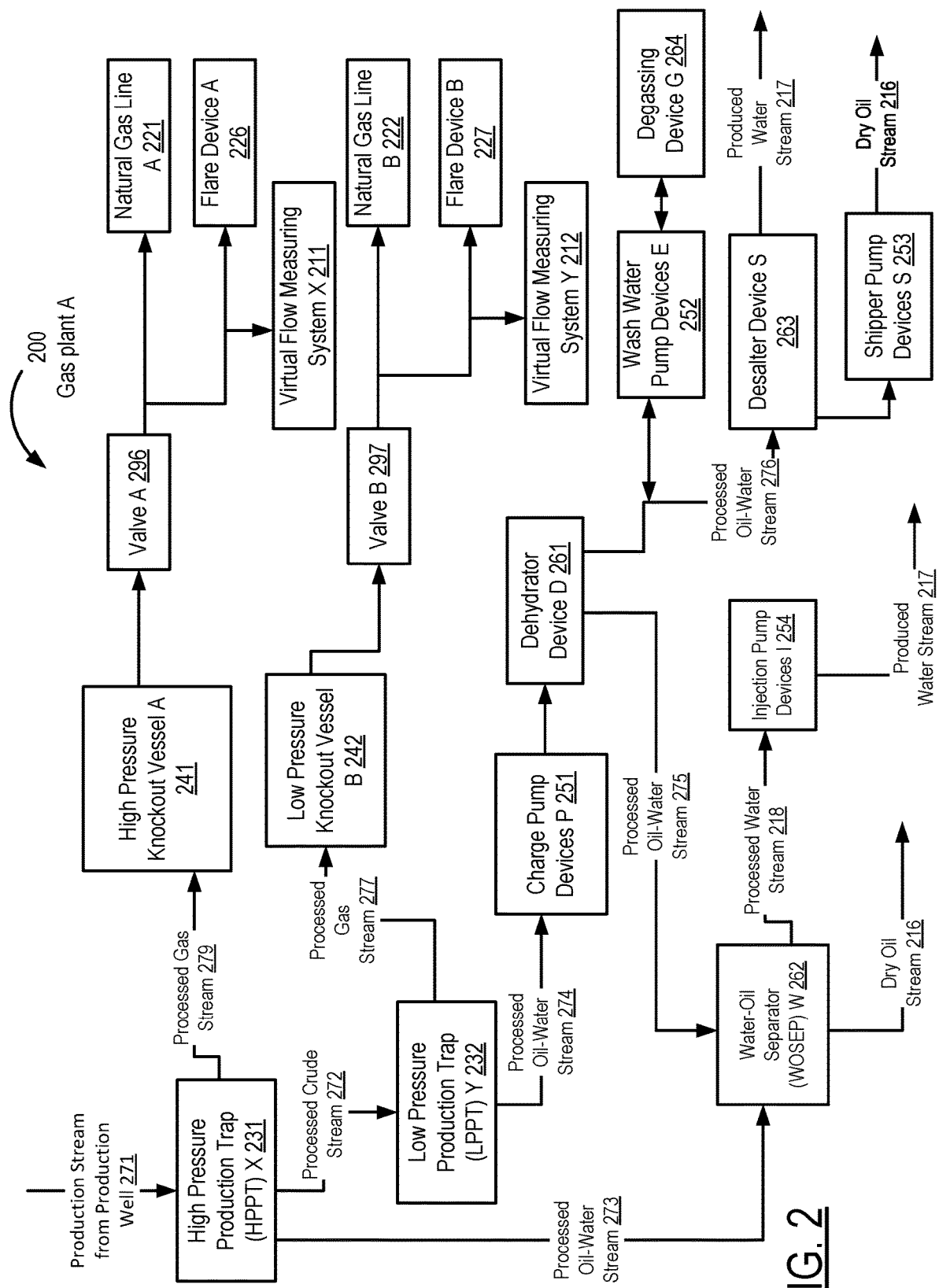

Turning to FIG. 2, FIG. 2 shows a schematic diagram in accordance with one or more embodiments. As shown in FIG. 2, a gas plant (e.g., gas plant A (200)) may include various industrial components for processing production (e.g., production stream from production well (285)) from one or more wells. In some embodiments, a gas plant is a gas-oil separation plant (GOSP) that includes a temporary or permanent facility that separates wellhead fluids into gas components and liquid components, such as dry oil (e.g., dry oil stream (216)) and produced water (e.g., produced water stream (217)). For example, temporary gas-oil separation facilities may correspond to newly drilled wells (e.g., where production potential is being assessed for a drilled well). Likewise, a permanent facility may be coupled to designated pipelines that transport natural gas, dry oil, natural gasoline, liquefied petroleum, condensate, and/or other processed products downstream.

Furthermore, a gas plant may include various production traps (e.g., high pressure production trap (HPPT) X (231), low pressure production trap (LPPT) Y (232)) that include functionality for separating a multi-phase stream (e.g., production stream (271) from production well, processed crude stream (272)) into respective streams (e.g., processed oil-water stream (273), processed oil-water stream (274), processed oil-water stream (275), processed oil-water stream (276), processed gas stream (277), processed gas stream (279)). For example, an HPPT may be a three-phase separator that includes various hardware components, such as a deflector, a water retention baffle, various compartments, etc. When wet crude oil enters an HPPT, the wet crude oil may separate into various outputs, e.g., off-gas, processed wet crude oil (i.e., a wet crude oil output that may still include some water and gas), and oily water (i.e., an oily water output that may include produced water with some remaining crude oil). More specifically, an HPPT may cause a pressure drop among hydrocarbon gases within wet crude oil that results in separation of various chemical components. With respect to an LPPT, an LPPT may be a two-phase separator that receives crude oil from the HPPT and separates remaining gas from the crude oil.

Keeping with FIG. 2, a gas plant may include one or more knockout vessels (e.g., high pressure knockout vessel A (241), low pressure knockout vessel B (242)). For example, a knockout vessel may be a knockout drum (KOD), a knockout trap, a water knockout, or a liquid knockout. With respect to knockout drums, a knockout drum may be a vessel that removes and accumulates various liquids (e.g., condensed liquids and entrained liquids) from relief gases. A knockout drum may have a horizontal configuration or a vertical configuration, which may be determined according to operating parameters and/or gas plant conditions. For example, a horizontal KOD may be used in situations with a large liquid storage capacity and/or high vapor flow in a particular pipeline as well as situations seeking a low pressure drop across the knockout drum. In contrast, a vertical KOD may be used in situations with a low amount of liquid load.

Turning to flare devices, a gas plant may include one or more flare devices (e.g., flare device A (226), flare device B (227)) coupled to a respective knockout drum (e.g., high pressure KOD A (241), low pressure KOD B (242)). For example, raw natural gas may be combusted in an open diffusion flame using one or more flare devices. More specifically, a flare device may include a gas flare, such as a vertical flare stack that includes various flaring equipment, e.g., a flashback prevention section, a pilot flame tip, a spark ignition device, and/or a water seal drum. The flare device may also correspond to a ground-level flare that includes a steel box or cylinder lined with refractory material.

In some embodiments, a flare device may consume raw natural gas, such as associated gas or waste gas. For example, associated gas may be natural gas that is a by-product of oil drilling, which is dominated by methane. Thus, this raw natural gas may be burned because natural gas pipelines are not in place when the oil well is drilled. In some embodiments, a flare device is used to perform routine flaring (also called production flaring) that disposes of unwanted associated gas during crude oil extraction. Besides routine flaring, a flare device may also be used for safety flaring, maintenance flaring, or other types of flaring operations.

A gas plant may include one or more flow conduits, such as a flowline from a well, a pipeline (e.g., for processing crude oil, produced water, and/or various mixture streams), and/or a natural gas line (e.g., natural gas line A (221), natural gas line B (222)) for transporting natural gas away from a gas plant. For example, a flow conduit may include hardware to implement a closed conduit between one or more inlets and one or more outlets. A gas plant may also include various valves (e.g., valve A (296), valve B (297)). A valve may be a closure element with hardware for opening and closing a conduit connection, such as a gate valve, a shutoff valve, a ball valve, a control valve, etc.

In some embodiments, a gas plant may include one or more virtual flow measuring systems (e.g., virtual flow measuring system X (211), virtual flow measuring system Y (212)) that include functionality for determining one or more gas flow rates. In particular, a virtual flow measuring system may include a control system or other computer device that acquires sensor measurements from multiple sensors with respect to a predetermined plant environment. Based on knowledge of this plant environment, a virtual flow measuring system may determine the gas flow rate at a particular location in a gas plant without using a flowmeter or a differential pressure sensor. In some embodiments, for example, a virtual flow measuring system uses a gas flow model to determine a respective flow rate. Examples of gas flow models may include orifice flow equations based on specific gas parameters and/or orifice parameters. Using a gas flow model, a virtual flow measuring system may use pressure data and/or temperature data in relation to a predetermined orifice to determine the gas flow rate.

Figure 3:
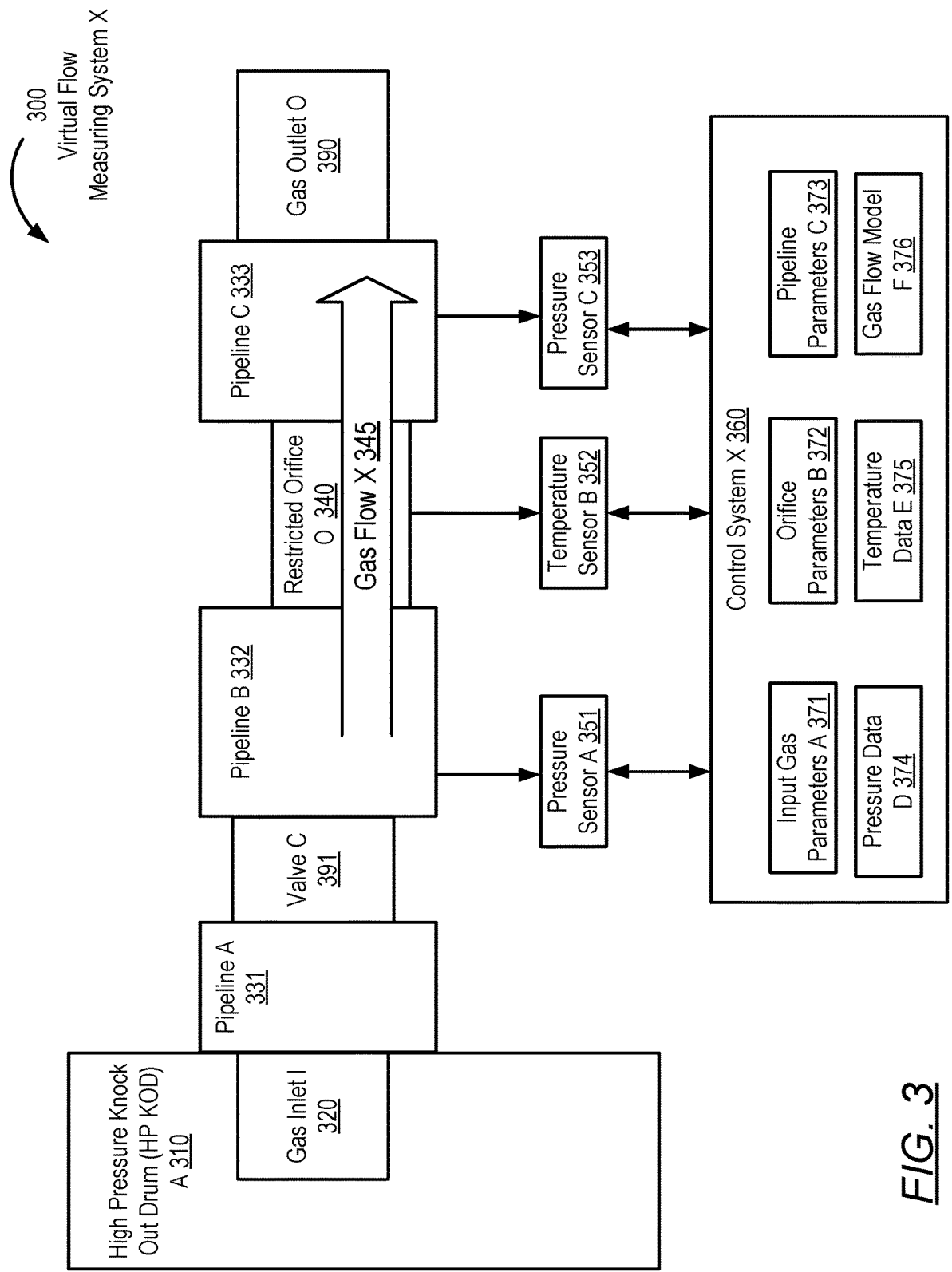

Turning to FIG. 3, FIG. 3 shows a schematic diagram in accordance with one or more embodiments. As shown in FIG. 3, a virtual flow measuring system (e.g., virtual flow measuring system X (300)) may include a control system (e.g., control system X (360)), a restricted orifice (e.g., restricted orifice O (340)), one or more pipelines (e.g., pipeline A (331), pipeline B (332), pipeline C (333)), one or more gas inlets (e.g., gas inlet I (320)), one or more gas outlets (e.g., gas outlet O (390)), and various sensors (e.g., pressure sensor A (351), temperature sensor B (352), pressure sensor C (353)). As illustrated in FIG. 3, for example, the virtual flow measuring system X (300) determines a rate of gas flow X (345) of a gas stream exiting a high pressure knockout drum (HPKOD) (310) that passes through an open valve C (391) to the gas outlet O (390), such as to a flare device for flaring or a natural gas line for transportation.

Moreover, a virtual flow measuring system may use various principles relating to a flowmeter to determine a gas flow rate. With respect to flowmeters, flowmeters may include an orifice plate (also called a restriction plate) that define a hole for measuring a flow rate. The orifice plate may be a thin plate with an orifice's hole, where the orifice plate is coupled to a pipeline. When a fluid (whether liquid or gaseous) passes through an orifice in the orifice plate, pressure may build upstream of the orifice. As fluid converges in order to pass through the orifice, fluid velocity may increase, which causes the fluid's pressure to decrease. At a location downstream of the orifice, a flow may be the point of maximum convergence, where a gas flow rate reaches a maximum value and the pressure approaches a minimum value. After this location, the gas flow may expand resulting in the gas flow rate to fall and pressure to increase. In comparison to FIG. 3, pressure sensor A (351) may be an upstream pressure sensor to the restricted orifice O (340), while pressure sensor B (353) may be the downstream pressure sensor to the restricted orifice O (340).

In some embodiments, a control system in the virtual flow measuring system includes a gas flow model (e.g., gas flow model F (376)). In particular, a gas flow model may describe one or more physical criteria or conditions for determining a gas flow rate. For example, a gas flow model may specify various input parameters (e.g., input gas parameters A (371), orifice parameters B (372), pipeline parameters C (373), pressure data D (374), and temperature data E (375)) to model a particular type of gas. For example, input gas parameters for a predetermined gas may include molecular weights, density values, expansion factors regarding the compressibility or incompressibility of a gas flow, etc. Orifice parameters may describe a particular restricted orifice, such as a diameter ratio of a restricted orifice, a discharge coefficient that may describe the ratio of an actual discharge through the orifice in relation to the theoretical discharge, a plate expansion factor, etc. Pipeline parameters may include one or more physical pipe dimensions, such as an inside diameter of one or more pipes or a length of pipe, for example. Pressure data may include pressure sensor values for one or more pressure sensors. Temperature data may include temperature sensor values for one or more temperature sensors.

In some embodiments, for example, a gas flow model corresponds to an orifice flow model that is expressed using the following equation:

$$q_m = \frac{C_d}{\sqrt{1-\beta^4}} d^2 \varepsilon \frac{\pi}{4} \sqrt{2\Delta p \rho_1} \quad \text{Equation 1}$$

where $q_m$ corresponds to an orifice plate flow rate, $C_d$ corresponds to a coefficient of discharge, $\beta$ corresponds to a diameter ratio of orifice diameter to pipe diameter, $\varepsilon$ corresponds to an expansibility factor, $\pi$ corresponds to a numerical constant for pi, $\Delta p$ corresponds to a differential pressure value, and $\rho_1$ corresponds to a gas or fluid density. Likewise, based on Equation 1, another gas flow model may be determined using the following equation:

$$Q = \frac{\beta^2 K_o 4057 D^2 F_a Y F_{pv} \sqrt{\Delta p} \sqrt{147 + P_{in}}}{\sqrt{\frac{M}{28.96}} \sqrt{460 + T_f}} 0.024 \quad \text{Equation 2}$$

where Q is a gas flow rate, $\beta$ is a diameter ratio of a diameter of the restricted orifice, $K_O$ is a discharge coefficient (also called $K_d$, and where the discharge coefficient value may range from 0.6-0.9 for many orifices), D is a pipe inside diameter, $F_a$ is a plate expansion factor, Y is an expansion coefficient, $F_{pv}$ is a super-compressibility factor (i.e., a super-compressibility factor may correct a gas flow model for compressibility of a gas when compared between flowing conditions and standard conditions), $P_{in}$ is an inlet pressure (e.g., upstream of a restricted orifice), $\Delta P$ is a pressure difference between an upstream pressure and a downstream pressure with respect to the restricted orifice, M is a molecular weight (e.g., measured lb/mol), and $T_f$ is a gas temperature (e.g., measured in ° F.). A plate expansion factor may depend on the plate material and the difference in temperature between a flowing gas and ambient temperate. Thus, the plate expansion factor may correct or calibrate a gas flow model for any expansion of an orifice plate due to changes in temperature.

With respect to control systems, a control system may include hardware and/or software that monitors and/or operates equipment, such as at a gas plant. In particular, a control system may be coupled to facility equipment and sensors to collect data throughout a facility. For example, facility equipment may include various hardware components, such as heat exchangers, pumps, valves, compressors, production traps, knockout vessels, desalters, loading racks, and storage tanks among various other types of hardware components. Examples of sensors may include pressure sensors, temperature sensors, torque sensors, rotary switches, weight sensors, position sensors, microswitches, hydrophones, accelerometers, etc. In some embodiments, a control system may include a programmable logic controller that may control valve states, fluid levels, pipe pressures, warning alarms, pressure releases and/or various hardware components throughout a facility. Thus, a programmable logic controller may be a ruggedized computer system with functionality to withstand vibrations, extreme temperatures, wet conditions, and/or dusty conditions, such as those around a refinery or drilling rig. Furthermore, a control system may be a computer system similar to the computer system (502) described in FIG. 5 and the accompanying description.

In some embodiments, a control system includes a distributed control system (DCS). A distributed control system may be a computer system for managing various processes at a facility using multiple control loops. As such, a distributed control system may include various autonomous controllers (such as remote terminal units) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a facility as well as remote control outside the facility. With respect to an RTU, an RTU may include hardware and/or software, such as a microprocessor, that connects sensors and/or actuators using network connections to perform various processes in the automation system.

Returning to FIG. 2, a gas plant may include one or more water-oil separators (WOSOPs) (e.g., WOSEP W (262)). For example, a WOSEP may include hardware to separate oil and water by centrifugation. Likewise, other WOSEPs are contemplated such as a hydrocyclone device that separates oil from water using a vortex. A gas plant may also include one or more desalting devices (e.g., desalter device S (263)). In particular, a wet crude stream may have formation water with salt dissolved in the formation water. Common types of salts may include sodium, magnesium, and calcium as the positive ions and chlorides, sulfates, and carbonates as the negative ions. Thus, a desalting device may include hardware to remove the salts from a particular fluid stream. Furthermore, a gas plant may include various pump devices, such as washing pumps (e.g., wash water pump devices E (252)), charge pump devices (e.g., charge pump devices P (251)), injection pump devices (e.g., injection pump devices 1(254)), and/or shipper pump devices (e.g., shipper pump devices S (253)).

Keeping with FIG. 2, a gas plant may include water processing equipment that includes hardware and/or software for extracting, treating, and/or disposing of water associated with crude oil processing. More specifically, a gas plant may extract produced water (e.g., produced water stream (217)) during the separation of oil or gas from a mixed fluid stream acquired from a gas well. This produced water may be a kind of brackish and saline water brought to the surface from underground formations. In particular, oil and gas reservoirs may have water in addition to hydrocarbons in various zones underneath the hydrocarbons, and even in the same zone as the oil and gas. However, most produced water is of very poor quality and may include high levels of natural salts and minerals that have dissociated from geological formations in the target reservoir. Likewise, produced water may also acquire dissolved constituents from fracturing fluids (e.g., substances added to the fracturing fluid to help prevent pipe corrosion, minimize friction, and aid the fracking process). However, through various water treatments, produced water may be reused in one or more gas wells, e.g., through waterflooding where produced water is injected into the reservoirs. By injecting produced water into an injection well, the injected water may force oil and gas to one or more production wells.

While FIGS. 1, 2, and 3 shows various configurations of components, other configurations may be used without departing from the scope of the disclosure. For example, various components in FIGS. 1, 2, and 3 may be combined to create a single component. As another example, the functionality performed by a single component may be performed by two or more components.

Figure 4:
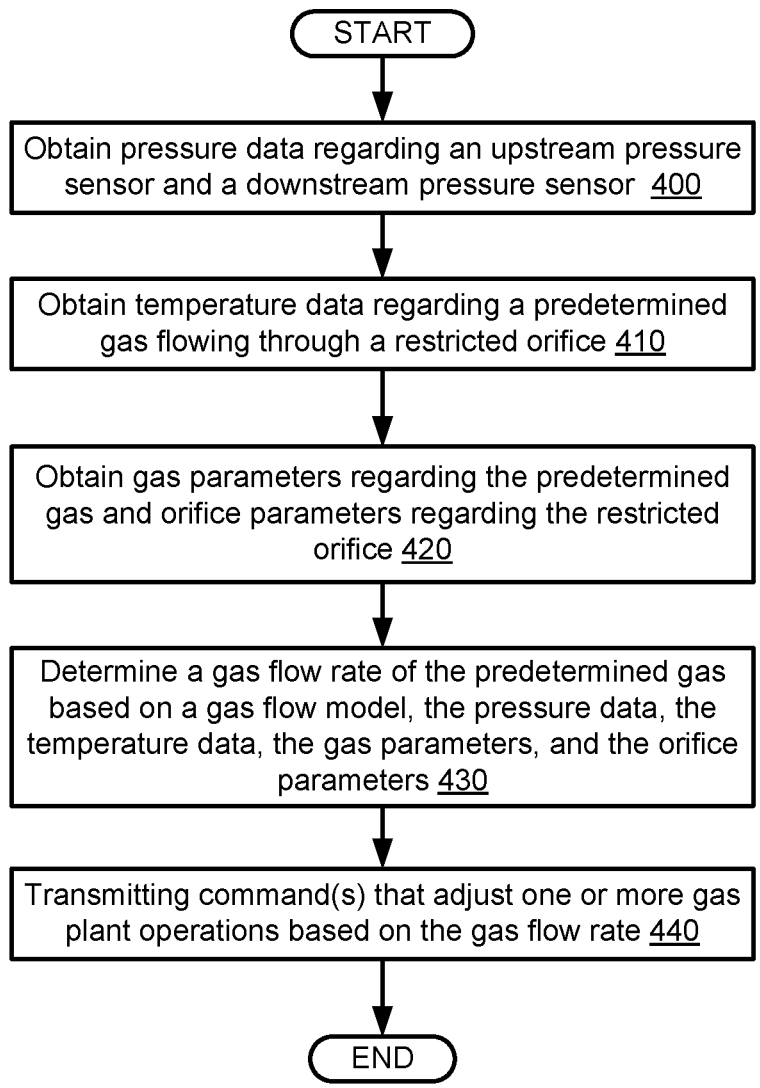
FIG. 4 shows a flowchart in accordance with one or more embodiments.

Turning to FIG. 4, FIG. 4 shows a flowchart in accordance with one or more embodiments. Specifically, FIG. 4 describes a general method for virtual flow sensing. One or more blocks in FIG. 4 may be performed by one or more components (e.g., virtual flow measuring system X (300)) as described in FIGS. 1, 2, and 3. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, pressure data are obtained regarding an upstream pressure sensor and a downstream pressure sensor in accordance with one or more embodiments. For example, a gas flow may pass through a particular restricted orifice, where upstream and downstream may be determined with respect to the particular orifice. A restricted orifice may refer to a particular section of processing pipe, such as a flowline or a pipeline, a cross-section within a valve, a particular gas inlet, a particular gas outlet, or other plant components with constant physical dimensions that are proximate pressure sensors and/or temperature sensors.

In Block 410, temperature data are obtained regarding a predetermined gas flowing through a restricted orifice in accordance with one or more embodiments. Depending on which restricted orifice is being analyzed, a temperature sensor may be used that is coupled to the restricted orifice or proximate to the restricted orifice. For example, temperature data may also include predicted temperature data extrapolated/interpolated for a particular restricted orifice based on other temperature sensor measurements.

In Block 420, various gas parameters regarding a predetermined gas and various orifice parameters regarding a restricted orifice are obtained in accordance with one or more embodiments. In some embodiments, for example, parameters are manually input by a user, such as using a user device (e.g., a human machine interface). For example, the input information may relate to various physical properties for a particular orifice (e.g., size, diameters, diameter ratios, discharge coefficients, etc.) and gas parameters (e.g., molecular weight, density, etc.). Likewise, information may be selected by a user within a graphical user interface and communicated to a computer device over a network. In some embodiments, gas parameters are stored in association with an orifice type (e.g., corresponding to a particular type of pipe) or a predetermined gas type, such as in a database or table. Thus, once a gas type or orifice type is selected by a user or a control system, gas parameters may be determined accordingly. In some embodiments, a gas sensor is used to determine a type of predetermined gas, which may be subsequently used to determine the corresponding gas parameters. Where the gas or orifice changes, the gas parameters and orifice parameters may be updated accordingly. For example, a gas flow correlation may rely on specific gas properties and/or specific orifice parameters. Therefore, changes in gas properties may affect the accuracy of a particular gas flow rate measurement.

In Block 430, a gas flow rate of a predetermined gas is determined based on a gas flow model, pressure data, temperature data, various gas parameters, and various orifice parameters in accordance with one or more embodiments. In particular, various systematic rules may be applied to pressure data and/or temperature to determine one or more gas flow rates. For example, the gas flow model may correspond to Equations 1 or 2 described above with respect to an orifice flow. In some embodiments, the gas flow model may be an algorithmic black box, such as a trained artificial neural network, where an output gas flow rate is based on input values corresponding to various parameters.

In Block 440, one or more commands are transmitted that adjust one or more gas plant operations based on a gas flow rate in accordance with one or more embodiments. In some embodiments, a gas flow rate is used in one or more applications within a gas plant. As such, a control system may adjust settings on one or more gas plant devices to achieve an optimal gas flow, e.g., at a flare device or natural gas line. With respect to flaring, a gas flow rate may be controlled using a virtual flow measurement system to maintain a desired transmission of the amount of gas necessary to keep a flare ignited. In some embodiments, gas flow rates are modified to achieve specific environmental impacts, such as reduce pollution. Likewise, other streams in a gas plant may be adjusted with respect to a particular gas flow rate value, e.g., a production stream may be increased or decreased according to a desired gas flow rate at one gas outlet.

Figure 5:
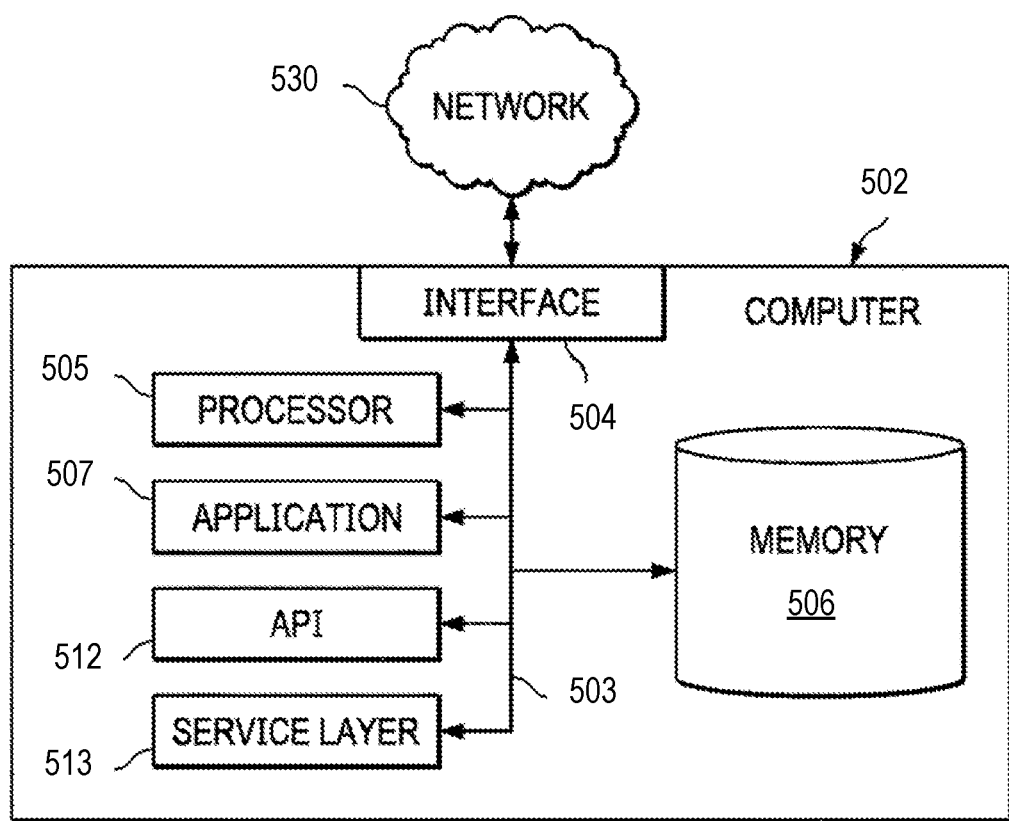
FIG. 5 shows a computer system in accordance with one or more embodiments.

Embodiments may be implemented on a computer system. FIG. 5 is a block diagram of a computer system (502) used to provide computational functionalities associated with described algorithms, methods, functions, processes, flows, and procedures as described in the instant disclosure, according to an implementation. The illustrated computer (502) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504 includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

In some embodiments, the computer (502) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A system, comprising:
a flare device;
a first pipeline comprising a restricted orifice and coupled to the flare device, wherein the first pipeline is configured to transmit a predetermined gas to the flare device;
a first pressure sensor coupled to the first pipeline and disposed upstream from the restricted orifice;
a second pressure sensor coupled to the first pipeline and disposed downstream from the restricted orifice; and
a first control system coupled to the first pressure sensor and the second pressure sensor,
wherein the first control system obtains a plurality of gas parameters associated with the predetermined gas and a plurality of orifice parameters associated with the restricted orifice based on a selection within a graphical user interface that is provided by a user device, and
wherein the first control system determines a first gas flow rate of the predetermined gas using a gas flow model, pressure data from the first pressure sensor and the second pressure sensor, the plurality of orifice parameters comprising a size of the restricted orifice, and the plurality of gas parameters regarding the predetermined gas.

2. The system of claim 1, further comprising:
a temperature sensor coupled to the restricted orifice,
wherein the first control system determines temperature data using the temperature sensor that describes a difference between an ambient temperature and a flow temperature at the restricted orifice, and
wherein the first control system determines the first gas flow rate based on the temperature data.

3. The system of claim 1,
wherein the gas flow model is based on an orifice flow equation, and
wherein the plurality of gas parameters comprise a gas compressibility factor or a molecular weight of the predetermined gas.

4. The system of claim 1, further comprising:
a production trap; and
a knockout vessel coupled to the first pipeline and the production trap,
wherein the knockout vessel obtains a gas stream from the production trap, and
wherein the knockout vessel remove liquid particles from the gas stream before sending the gas stream to the first pipeline.

5. The system of claim 1,
wherein the first control system adjusts the first gas flow rate to produce a second gas flow rate of the predetermined gas that maintains a flare at the flare device, and
wherein the second gas flow rate is less than the first gas flow rate.

6. The system of claim 1, further comprising:
a second control system that implements a virtual measuring device,
wherein the virtual measuring device comprises a third pressure sensor, a fourth pressure sensor, a temperature sensor, and a second restricted orifice,
wherein the virtual measuring device determines a second gas flow rate through a second pipeline that is different from the first pipeline.

7. The system of claim 1,
wherein the flare device is a flare stack comprising a pilot flame tip and a spark ignition device, and
wherein the flare device combusts the predetermined gas.

8. The system of claim 1,
wherein the first control system is a distributed control system (DCS).

9. The system of claim 1,
wherein the first control system is disposed at an oil and gas plant that produces natural gas and dry oil,
wherein the oil and gas plant is coupled to a production well,
wherein a production stream from the production well is transmitted to a production tank,
wherein the production stream is processed by at least one knockout vessel, at least one water-oil separator, a dehydrator, and a desalter device, and
wherein the predetermined gas is obtained from the production stream.

10. A method, comprising:
obtaining, by a control system, first pressure data regarding a first pressure sensor upstream from a restricted orifice and second pressure data regarding a second pressure sensor downstream from the restricted orifice;

obtaining, by the control system, temperature data regarding a temperature sensor coupled to the restricted orifice;

obtaining, by the control system and using a graphical user interface that is provided by a user device, a selection comprising a plurality of gas parameters regarding a predetermined gas flowing through the restricted orifice and a plurality of orifice parameters regarding the restricted orifice; and determining, by the control system, a first gas flow rate of the predetermined gas based on a gas flow model, the first pressure data, the second pressure data, the temperature data, the plurality of gas parameters, and the plurality of orifice parameters.

11. The method of claim 10, further comprising:

transmitting, by the control system, a command that adjusts the first gas flow rate to produce a second gas flow rate of the predetermined gas, wherein the second gas flow rate is less than the first gas flow rate.

12. The method of claim 10, wherein the temperature data describes a difference between an ambient temperature and a flow temperature at the restricted orifice, and wherein the first gas flow rate is determined based on the difference between the ambient temperature and the flow temperature at the restricted orifice.

13. The method of claim 10, wherein the predetermined gas is sent to a flare device, wherein the flare device is a flare stack comprising a pilot flame tip and a spark ignition device, and wherein the flare device combusts the predetermined gas.

14. The method of claim 10, wherein the gas flow model is based on an orifice flow equation, and wherein the plurality of gas parameters comprises a gas parameter that corresponds to a gas compressibility factor or a molecular weight of the predetermined gas.

15. The method of claim 10, wherein the control system is disposed at an oil and gas plant that produces natural gas and dry oil, wherein the oil and gas plant is coupled to a production well, and wherein the predetermined gas is obtained from a production stream from the production well.

16. The method of claim 10, wherein the control system determines a plurality of gas flow rates for a plurality of restricted orifices in a gas plant, and wherein the control system is a distributed control system (DCS).

17. A system, comprising:

a pipeline comprising a restricted orifice and coupled to a gas inlet and a gas outlet, wherein the pipeline is configured to transmit a predetermined gas from the gas inlet to the gas outlet;

a first pressure sensor coupled to the pipeline and disposed upstream from the restricted orifice;

a second pressure sensor coupled to the pipeline and disposed downstream from the restricted orifice; and a computer device coupled to the first pressure sensor and the second pressure sensor, wherein the computer device provides a graphical user interface and obtains a plurality of gas parameters associated with the predetermined gas and a plurality of orifice parameters associated with the restricted orifice based on a selection within the graphical user interface, and wherein the computer device determines a first gas flow rate of the predetermined gas using a gas flow model, pressure data from the first pressure sensor and the second pressure sensor, the plurality of orifice parameters comprising a size of the restricted orifice, and the plurality of gas parameters regarding the predetermined gas.

18. The system of claim 17, further comprising:

a temperature sensor coupled to the restricted orifice, wherein the computer device determines temperature data using the temperature sensor that describes a difference between an ambient temperature and a flow temperature at the restricted orifice, and wherein the computer device determines the first gas flow rate based on the temperature data.

19. The system of claim 17, wherein the gas flow model is based on an orifice flow equation, and wherein the plurality of gas parameters comprise a gas compressibility factor or a molecular weight of the predetermined gas.

20. The system of claim 17, wherein the computer device adjusts the first gas flow rate to produce a second gas flow rate of the predetermined gas, and wherein the second gas flow rate is less than the first gas flow rate.

* * * * *